United States Patent
Bahr et al.

[19]

[11] Patent Number: 6,091,500
[45] Date of Patent: Jul. 18, 2000

[54] METHOD AND APPARATUS FOR MEASURING OVERCLAD TUBES

[75] Inventors: Charles Chester Bahr, Watchung; Dennis J. Trevor; Paula L. Trevor, both of Clinton, all of N.J.

[73] Assignee: Lucent Technologies Inc., Murray Hill, N.J.

[21] Appl. No.: 09/212,888

[22] Filed: Dec. 16, 1998

[51] Int. Cl.[7] .......................... G01B 11/02; G01N 21/00
[52] U.S. Cl. .................. 356/384; 356/73.1; 250/559.24; 250/559.28
[58] Field of Search .................................. 356/381, 382, 356/384–387, 73.1, 426; 250/559.24, 559.27, 559.28

[56] References Cited

U.S. PATENT DOCUMENTS

| | | | |
|---|---|---|---|
| 4,638,168 | 1/1987 | Marino et al. | 356/384 |
| 4,978,223 | 12/1990 | Kutchenriter et al. | 356/384 |
| 5,118,954 | 6/1992 | Grosso et al. | 356/73.1 |
| 5,867,275 | 2/1999 | Curtis, Jr. et al. | 356/384 |

*Primary Examiner*—Frank G. Font
*Assistant Examiner*—Amanda Merlino
*Attorney, Agent, or Firm*—Thomas, Kayden, Horstemeyer & Risley, L.L.P.

[57] ABSTRACT

A method and apparatus for measuring and determining certain parameters of an overclad tube measures the OD and the wall thickness of the tube at a plurality of longitudinal points and a plurality of angles at each point or longitudinal position. A laser device measures the OD and an ultrasonic transducer measures the wall thickness. The inside diameter of the tube at each point is determined by subtracting the wall thickness from the measured outside diameter. From the data then obtained, the straight through internal clearance of the tube is calculated by determining a plurality of bow vectors which represent the deviations of the tube inner diameter from a least squares fit.

15 Claims, 4 Drawing Sheets

SUMMARY OF MEASURED AND CALCULATED DIMENSIONAL CHARACTERISTICS

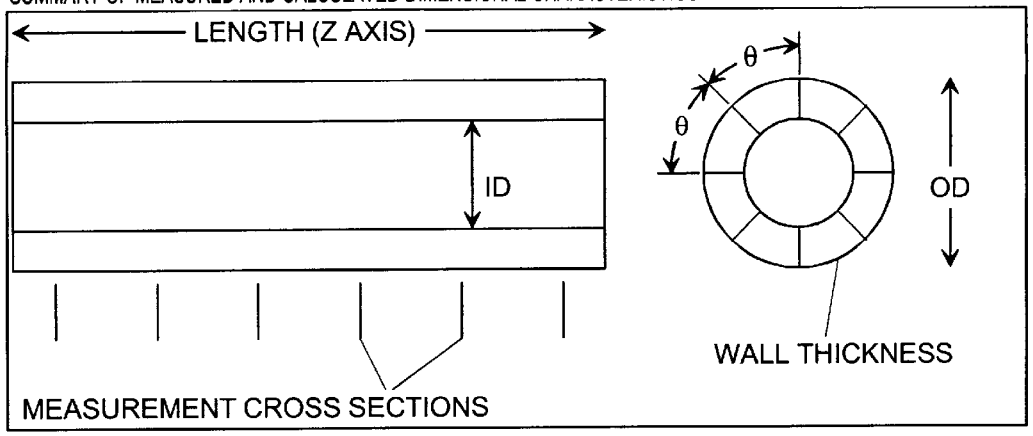

| PARAMETERS | DERIVED FROM |
|---|---|
| OD avg, σ, min, max | MEASURED OD |
| WALL avg, σ, min, max | MEASURED WALL THICKNESS |
| ID avg, σ, min, max | OD-OPPOSITE WALL THICKNESS |
| CSA avg, σ, min, max | $CSA_Z = \frac{\pi}{4}\left(\overline{OD}^2 - \overline{ID}^2\right)$ |
| OVALITY | $OVALITY_Z = \max[OD_Z] - \min[OD_Z]$ (max DIFFERENCE IN OD AT EACH CROSS SECTION) |
| SIDING | $SIDING_Z = \max\left\vert Wall_\alpha - Wall_{\alpha+180°}\right\vert_Z$ |
| ID_DIFF | $ID\_DIFF_Z = \max[ID_Z] - \min[ID_Z]$ (max DIFFERENCE IN ID AT EACH CROSS SECTION) |
| DELTA-ID | $ID_{max} - ID_{min}$ (DIFFERENCE BETWEEN OVERALL min AND max) |
| CSA diff% | $(\max[CSA_Z] - \min[CSA_Z]) / \overline{CSA} \times 100\%$ |
| STIC | MAXIMUM DIAMETER STRAIGHT CYLINDER THAT WILL PASS THROUGH THE TUBE, FITTED BY ALLOWING TILT AND OFFSET TO VARY IN 3-D. |
| OVALITY-AVG% | $\left(OVALITY_Z / \overline{OD}\right) \times 100\%$ |
| BOW (EXTERIOR MAX) | MAXIMUM OF THE BOW MAGNITUDE, DEFINED AS THE DISTANCE FROM THE CENTER OF THE TUBE CROSS SECTION FROM THE BEST FIT LINE APPROXIMATING THE CENTERLINE. |
| BOW (CAMBER) | CALCULATED MAXIMUM AIR GAP BETWEEN TUBE OUTER SURFACE AND FLAT SURFACE (mm). |
| LENGTH | TUBE LENGTH (mm) AFTER HANDLE AND DISTORTED PORTIONS ARE REMOVED. |

*FIG. 5*

METHOD AND APPARATUS FOR MEASURING OVERCLAD TUBES

FIELD OF THE INVENTION

This invention relates to the manufacture of optical fibers and, more particuularly, to a process of determining the suitability of an overcladding tube to be used for overcladding the fibers.

BACKGROUND OF THE INVENTION

Optical fibers have, for a variety of reasons, become the communication medium of choice, and, consequently, the techniques for fabricating optical fibers have undergone steady improvement and refinement. Improved techniques have, in turn, led to, or made possible, improvements in fiber design, thus the two aspects of optical fiber fabrication, i.e., design and fabrication, "feed" upon each other, to the ultimate benefit of the communications field.

An optical fiber typically comprises a central core having an index of refraction greater than that of the material surrounding the core, i.e., the cladding, which is typically a doped silica glass. The indices of refraction can be varied by appropriate doping to achieve the best or most desirable transmission characteristics. The fiber is generally drawn from a preform, a glass body, typically a rod, produced by, for example, a chemical vapor deposition on the interior of a heated glass tube or substrate. The heat causes a glass forming reaction to take place on the inner surface of the tube, and then heat is applied to collapse the glass tube, thereby forming a glass rod. Alternatively, the rod may be produced by an outside vapor deposition on a glass substrate, and then a silica sleeve is shrunk around the rod to form a preform rod ready for drawing. The present application deals primarily with the first mentioned, or interior, deposition process, although it is applicable to preform rods in general, regardless of the process by which they are formed.

More fiber can be drawn from the preform if the rod has a relatively large diameter, which can be achieved by the substrate tube being made thicker. However, in the inside deposition process, such a thick tube or substrate would have too great a thermal impedance, making it difficult to sustain the glass forming reaction inside the tube and subsequently to collapse the tube with conventional exterior heating sources. In order to overcome this problem, it has been proposed, and subsequently practiced, that an appropriately scaled-up amount of deposited glass be synthesized inside of a standard silica tube and the tube then be collapsed to form the rod-like preform. The rod is then overclad by a silica tube which is shrunk around the rod, thereby encasing it in an overcladding. The fiber is then drawn from the overclad preform, and has a core of diameter d, a first cladding region of diameter $D_1$, a substrate tube derived cladding having a diameter D', and an overcladding of diameter $D_0$. Control of the diameters and the different diametric ratios enables production of more optical fibers of the desired transmission characteristics from an overclad preform of a given length. U.S. Pat. No. 5,044,724 of Glodis et al., the disclosure of which is incorporated by reference herein, gives a detailed description of the foregoing process, as well as the various diameters and their relationships and the indices of refraction of the components of the completed fiber.

Overcladding thus achieves the desired goal of more fiber produced per preform. However, the use of a glass tube into which the rod-like preform is inserted presents problems unique to the process. For example, the overcladding tube may be slightly non-circular or eccentric, or it may have a bow such that the circular straight interior is less than that of a perfectly straight, unbowed tube, which places a limit on the diameter of the preform that can be inserted into the overcladding tube. In some cases the bow, for example, may be such that a preform cannot be inserted therein. Other possible geometric variations in the overcladding tube, such as wall thickness variations and/or taper of the internal diameter also place limitations upon the straight through internal clearance (STIC) of the tube, and, as a consequence, upon the dimensions (primarily outside diameter) of the preform rod that can be inserted in the tube.

It can readily be appreciated that a process and apparatus which makes possible the obtainability of precise and accurate measurements of the various parameters of a glass tube, such as outside diameter, inside diameter, bow, and taper would have a salutary effect on the manufacture of glass tubes as well as the manufacture of optical fibers. Such measurements should indicate whether a given tube can be used without further operation thereon, whether the tube can be straightened to make it viable, or whether it must be scrapped. In addition, information obtained from the measurements could indicate necessary changes in the process of making the tubes to increase usability and productivity.

SUMMARY OF THE INVENTION

The present invention is a method and apparatus for obtaining accurate measurements of the parameters of a glass tube for use as the overcladding tube for rod-like preforms.

The tube to be measured is placed on mandrels which, during the process, rotate the tube in a number of steps, such as twenty, by means of a rotary stepping motor. A laser micrometer, mounted on a linear translator, is moved along the longitudinal length of the tube in steps. At each translational step the tube is rotated in, for example, twenty steps while the laser micrometer measures the outside diameter of the tube and the position of one edge thereof relative a reference position. The measurements are repeated at each one of the translational or longitudinal steps and the data thus obtained are applied to a central processor.

An ultrasonic transducer is mounted to travel with the laser micrometer and measures the thickness of the tube wall at each of the twenty rotary positions at each of the ten translational positions, with the data being applied to the processor. The processor determines the inside diameter of the tube at each position by subtracting the opposite wall thickness from the measured outside diameter. Once these determinations are made, the center of each of a series of circles, one circle per translational position, is calculated and used to define a body centerline which, if bow is present, deviates from the straight line connecting the first and last circle centers. The body centerline is then fitted to the straight line and deviations of the body centerline from a least squares fit are calculated. These deviations, or residuals, are referred to as the bow vectors which describe the magnitude and angular orientation of the body centerline from the least squares fit. The camber, which is a calculated parameter which describes the bow, is calculated from the measured bow as the greatest difference between the maxima and the minima of the bow vector projections along different angles. The bow vectors for the inside surface are calculated from the exterior bow vectors, the OD at each angle, and the wall thickness (denoted as WTK, WT, or WALL) at the same angle. From the interior bow and ID, the largest straight interior is given and hence the straight through internal clearance (STIC). It is desirable that the diameter of the preform rod be approximately 0.2 to 0.3 mm less than the diameter as given by the STIC, for minimum clearance for the rod within the overclad tube. Contact between the inner wall of the tube and the exterior of the rod is to be avoided yet clearance is held to a minimum to reduce eccentricity in the drawn fiber. In practice, some contact between the rod and the inner wall of the tube does occur, but the clearance serves to minimize it. The clearance also allows some freedom of the rod within the tube so that when the rod is inserted therein, it doesn't become stuck if the tube has only minor distortions.

The information obtained with the foregoing process makes it possible to select a rod of a given diameter to insert into the overcladding tube. Also, it enables a determination of whether the tube can be straightened or trimmed to increase STIC, or whether the tube otherwise cannot be used for overcladding any one of the available preforms.

The apparatus and method of the present invention will be more clearly understood, and the principles and features more apparent, from the following detailed description, read in conjunction with the drawings.

DESCRIPTION OF THE DRAWINGS

FIG. 5 is a table illustrating the various tube parameters determined by the method of the invention.

DETAILED DESCRIPTION

Figure 1:
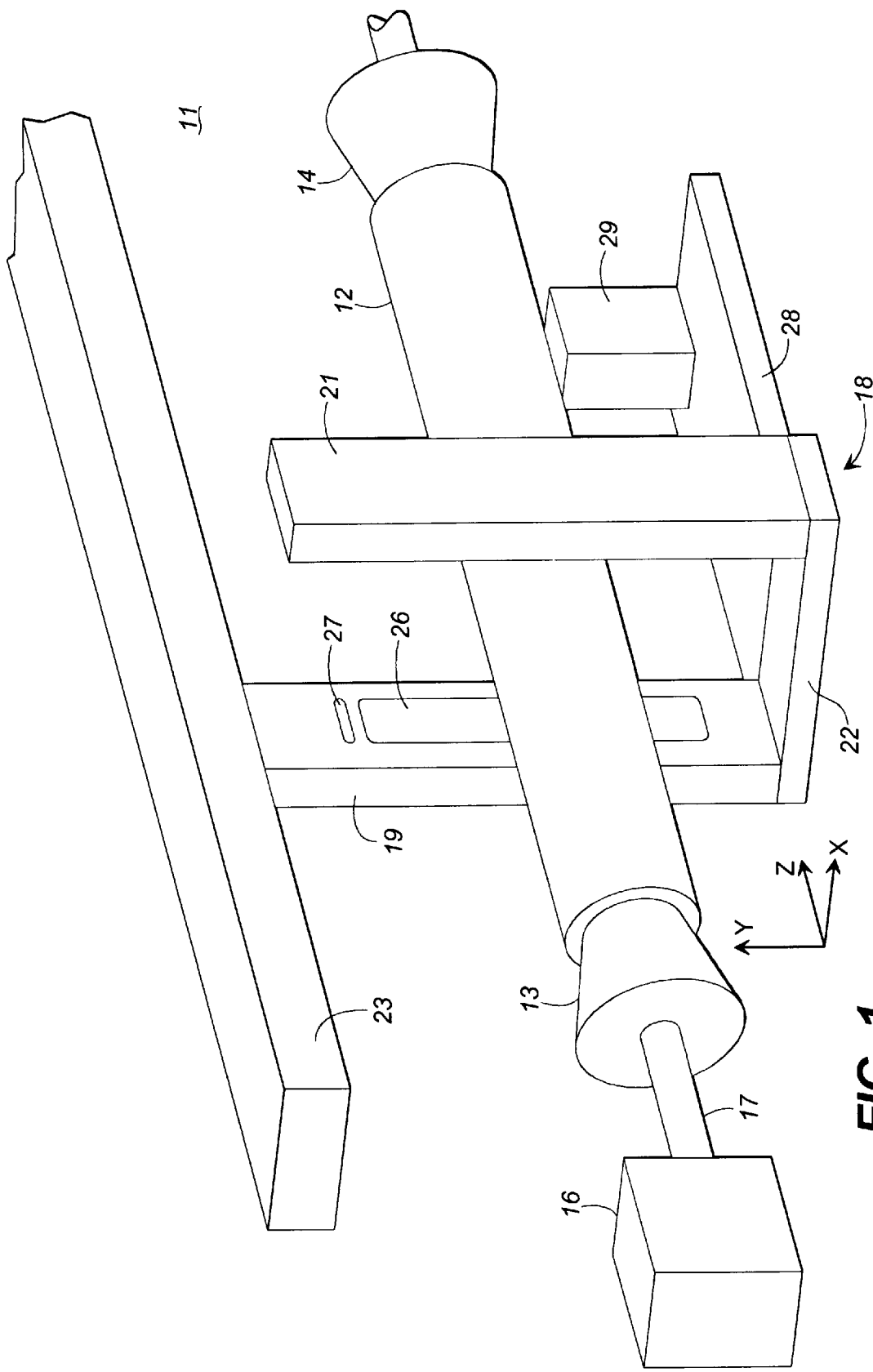
FIG. 1 is a perspective view of the apparatus for carrying out the method of the invention.

FIG. 1 is a perspective view of the apparatus 11 of the present invention by which the data is produced for determining various parameters which characterize the overclad tube 12 under test. In the apparatus 11 of FIG. 1, the tube 12 is held between arbors 13 and 14 in the form of mounting cones. As shown, a rotary stepping motor 16 is connected through a drive shaft 17 for rotating cone 13 and hence tube 12. As will be discussed more fully hereinafter, tube 12 is rotated in steps, approximately twenty at each longitudinal position, so that complete and accurate measurements may be made of the circumference of the tube. Arbor or cone 14 is free to turn, its primary function being to support 12 rotationally. A measuring apparatus 18 in the form of a U-shaped member having first and second vertically oriented arms 19 and 21 and a cross arm 22 carries the measuring devices for accumulating sufficient data to evaluate the tube 12. Arm 19 is mounted, at its upper end, to a linear translator 23 which moves the measuring apparatus 18 in translation along the length of the tube 12 in steps, such as, for example, ten steps. Arm 21 contains or supports a laser device 24, not shown, which generates a thin planar sheet of light directed at the tube 12. Arm 19 has mounted thereon or therein an optical detector 26 for detecting the beam from laser 24. Optical detector 26 also may have a reference slit 27 which functions to establish a reference edge for use in the measurements. Alternatively, the physical edge (or end) of the detector may serve as the reference. It is to be understood that slit 27 represents only one way of establishing a reference edge, there being various alternative ways of achieving the same result. Mounted to cross arm 22 is a support plate 28 upon which is mounted an ultrasonic transducer 29 which will be discussed in greater detail hereinafter.

Figure 2:
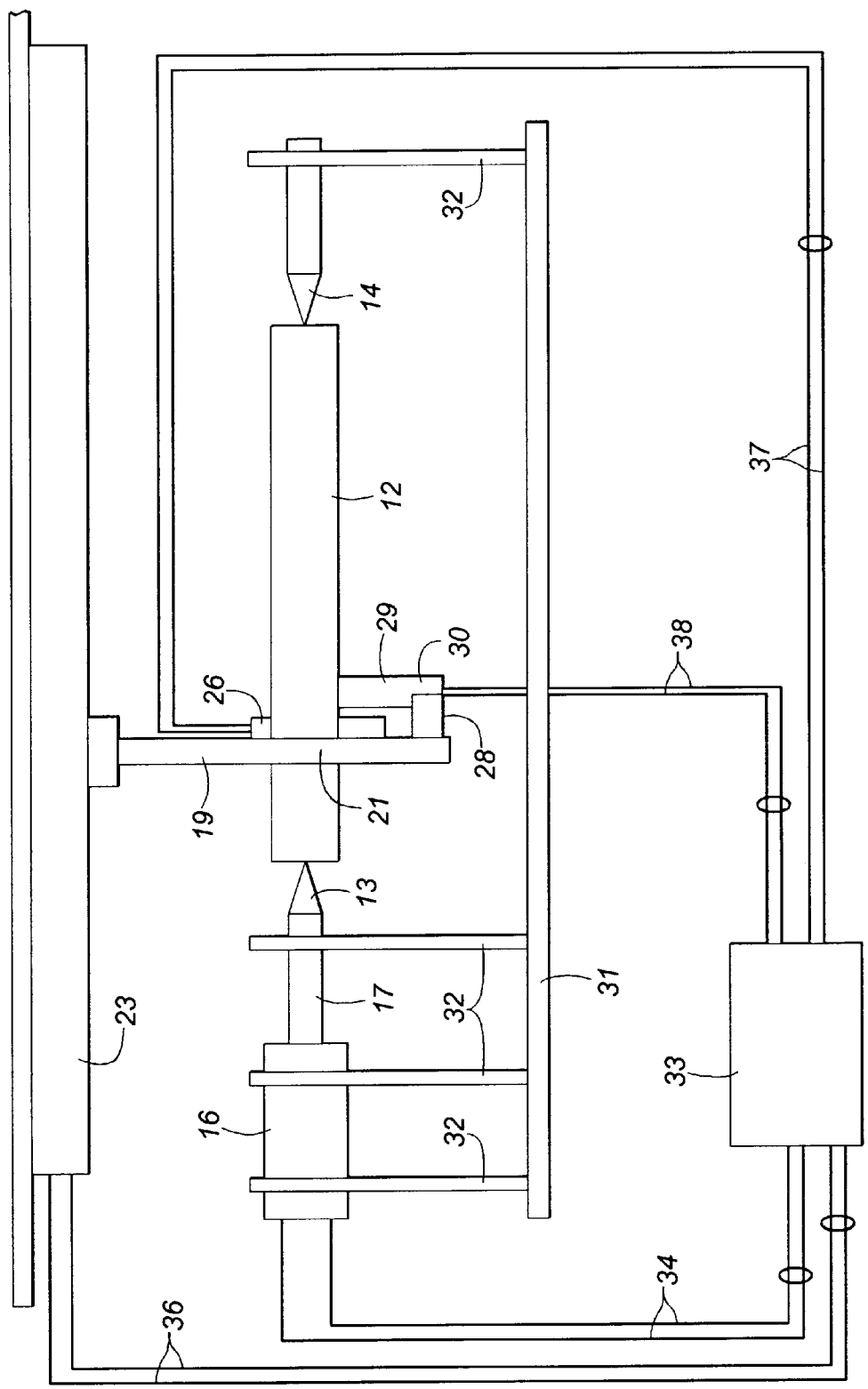
FIG. 2 is a diagrammatic, schematic view of the apparatus.

FIG. 2 is a partially diagrammatic, partially schematic representation of the apparatus 11 of FIG. 1. It can be seen that stepping motor 16 and arbors 13 and 14 are supported in alignment on, for example, a bed 31 by means of suitable supports 32. The support arrangement depicted is intended only to represent any of a number of possible support arrangements whereby the apparatus is maintained in proper alignment. As was pointed out in the foregoing, step motor 16 rotates the tube 12 in steps, such as, for example, twenty steps, under commands from a central processing unit 33 (CPU) connected thereto by connecting wires 34. In like manner, linear translator 23 moves the measuring apparatus 18 longitudinally in steps, such as, for example, ten steps, under command of CPU 33, connected thereto by wires 36. The output of the optical detector 26 is applied to CPU 33 by means of connecting wires 37, and the ultrasonic transducer is connected to the CPU 33 by means of wires 38. It is to be understood that laser device 24, optical detector 26, and ultrasonic transducer 29 receive operational power under control of the CPU, and the wires 37 and 38 are intended to represent the power connections as well as the signal or data connections.

Figure 3:
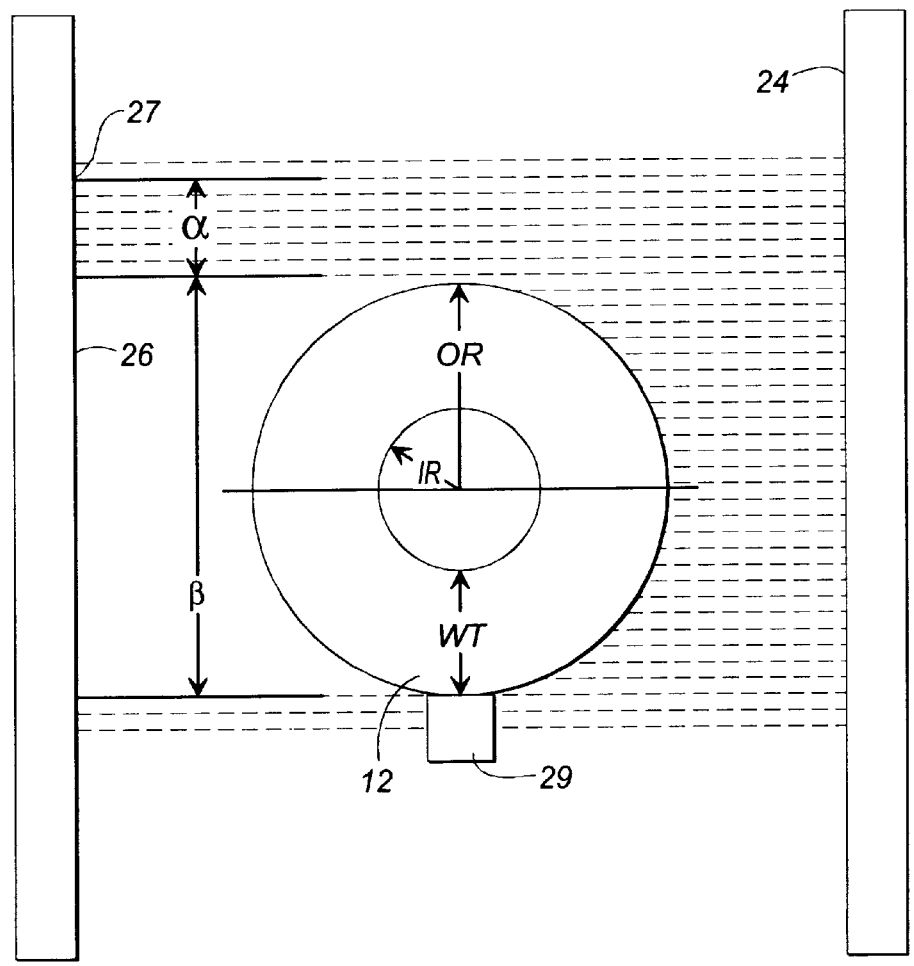
FIG. 3 is a diagrammatic view of a portion of the apparatus of FIGS. 1 and 2.

In operation, with an overclad tube 12 mounted on the mandrels 13 and 14, the measuring apparatus 18 is stepped, in translation, to the first measurement position and the outside diameter (OD) thereof is measured for a first angular position as shown in FIG. 3. The sheet-like or thin planar laser beam passes from the laser 24 to the optical detector 26, but is blocked by the tube 12 as shown therein. The detector 26 thus creates a signal which indicates the OD ($\beta$) which is a measure of the shadow of the tube, as shown. The distance $\alpha$ from the outside edge of the tube 12 to the reference line or slit 27 is also recorded and this data is passed to the CPU 33. At this translational point, the tube is stepped by means of step motor 16 through twenty different, preferably equi-angular positions, and $\alpha$ and $\beta$ are recorded for each angular position. After the data for each position, the stepping process repeated for the ultrasonic transducer 29 and the wall thickness (WT) is measured at each angular position. In practice, inasmuch as the transducer 29 is offset from the laser beam, it has been found to yield more rapid data acquisition if the OD in measured at all of the translational positions throughout the length of the tube 12, and the wall thickness measured in the reverse series of the translational positions as the measuring apparatus 18 is returned to its initial or starting position. With proper programming of the CPU, the wall thickness WT can be measured at approximately the same positions on the tube 12 as were the OD measurements.

The ultrasonic transducer 29 is used for measurement of the wall thickness WT inasmuch as its measurements are not distorted by tube opacity or variations in dielectric constant or transmissivity of the tube 12, as could be the case with optical measuring devices. The transducer 29 itself is preferably encased in a water reservoir for better signal coupling and is moved into and out of contact with tube 12 by means of a pneumatic cylinder 30. During such rotation or translational movement of the apparatus 18, the transducer 29 is held out of contact with tube 12, and is only moved into contact by the pneumatic cylinder when the apparatus 18 and tube 12 are stationary with respect to each other. The transducer is positioned by means of a stepping motor, not shown, so that the end face thereof is substantially tangent with respect to the outer surface of tube 12 for maximum efficiency and reliability.

Figure 4:
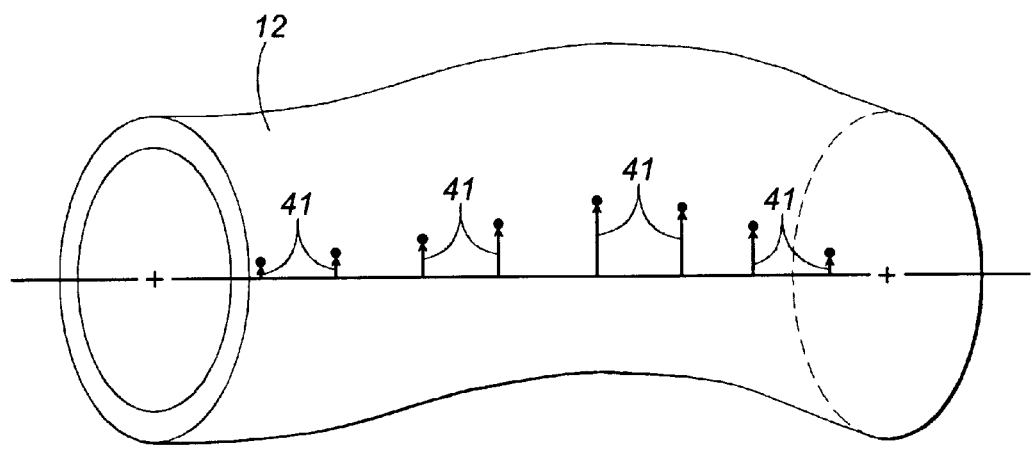
FIG. 4 is a view of a distorted overclad tube, illustrating one of the parameters determined by the process of the invention.

With the data thus obtained, the next steps in the process involve computing the various parameters of the overclad tube 12 for evaluating its use as an overclad tube. There is shown in FIG. 4, for illustrative purposes, an overclad tube 12 having a pronounced bow therein. The inner diameter (ID) of the tube 12 at each of the several test points is determined by subtracting the measured wall thicknesses at that point and at the particular angle from the measured outside diameters at the same point and angles. Also, the cross-sectional area (CSA) of the glass itself is obtained.

Next, the ovality of the tube 12 is determined by subtracting the minimum measured OD from the maximum measured OD at each cross-section, and the maximum difference in ID at each cross section (ID-DIFF) is determined by subtracting the minimum ID from the maximum ID. The overall difference in ID along the tube length, which is a measure of the taper of the ID is obtained by subtracting the overall minimum ID from the overall maximum ID, the result is termed the delta ID, and it, plus the change in computed cross sectional area, is a measure of the tube taper.

The STIC, which is the most reliable indication of the suitability of the tube 12 for use as an overclad tube, and of the size or diameter of the preform rod that may be inserted therein is determined, using the aforementioned parameters, by creating, by computation, a series of distorted circles, the centers of which are fitted to a straight line. The inner surface straightness is then determined by subtracting the wall thickness from the OD. The deviations of the centers of the inner circles from the centerline, the bow vectors, which are shown in FIG. 4 as elements 41, are determined by fitting the circle centers, by a least squares method, to the body centerline. The camber can then be calculated as the greatest distance between the maxima and minima of the bow vector projections. It is then possible, from these calculations, to determine the maximum straight through internal clearance, or STIC, thereby indicating the maximum rod diameter usable with that particular tube. FIG. 5 is a table of the various parameters of the overclad tube as determined by the method steps of the present invention.

As was pointed out hereinbefore, the method of the invention also is useful in the determinations of changes in tube production to eliminate recurring distortions. Thus, a frequently occurring distortion, such as taper, bow, ovality, or the link, can most often be attributed to some step in the tube fabrication, and measures can be taken to eliminate it.

From the foregoing, it can be seen that the method of invention is effective in determining suitability of overclad tubes for use with preform rods, including what maximum diameter of rod can be used with any particular overclad tube.

In conclusion, it should be noted that it will be obvious to those skilled in the art that many variations and modifications may be made to the preferred embodiment without departure from the principles of the present invention. All such variations and modifications are intended to be included herein as being within the scope of the present invention as set forth in the claims hereinafter. Further, in the claims, the corresponding structures, materials, acts and equivalents of all means or step plus function elements are intended to include any structure, material or acts for performing the functions with other claimed elements as specifically claimed.

What is claimed is:

1. A method of determining the parameter of an overclad tube comprising the steps of:

determining the outside diameter (OD) of the tube at a plurality of points along the length thereof;

measuring the wall thickness of the tube at said plurality of points and determining the inside diameter (ID) of the tube at each of said plurality of points;

determining the bow of the tube along its length by determining the location of the center of the ID at each of said plurality of points relative to a straight line between the centers at the first of said plurality of points and at the last of said plurality of points;

determining the straight through internal clearance (STIC) of the tube by creating a series of bow vectors from a least squares fit to said straight line and determining the camber of the bow from the greatest difference between the maxima and minima of the bow vectors, thereby determining the maximum diameter of a rod that can fit within the tube.

2. A method as claimed in claim 1 wherein said plurality of points includes a plurality of locations along the tube length and a plurality of angularly separated circumferential points at each of said plurality of locations.

3. A method as claimed in claim 2 wherein the OD is determined by directing a planar laser beam at the tube, and detecting the size of the shadow created by the tube.

4. A method as claimed in claim 3 wherein said wall thickness is determined by an ultrasonic transducer.

5. A method as claimed in claim 4 wherein the OD measurements are made at each of said plurality of points along the tube in a first longitudinal direction and the wall thickness measurements are made at each of the said plurality of points along the tube in a second, reverse longitudinal direction.

6. A method as claimed in claim 2 including the step of determining the ovality of the tube by subtracting the minimum measurement OD from the maximum measured OD at each of said plurality of locations along the tube length.

7. A method as claimed in claim 2 including the step of determining the siding of the tube at each of said locations along the tube length by subtracting the minimum wall thickness from the maximum wall thickness.

8. A method as claimed in claim 2 including the steps of determining the tube taper by determining the cross-sectional area of the tube at each of said locations and subtracting the overall minimum ID from the overall maximum ID.

9. An apparatus for measuring glass tubular members comprising:

first and second spaced rotatable arbors for holding the tubular member in position;

a motor for rotating at least one of said arbors in a series of rotational steps;

a measuring apparatus mounted to a linear translator member for moving said apparatus between said first and second arbors in a series of steps defining a plurality of measuring points;

said measuring apparatus having first and second laterally spaced members adapted to straddle the tubular member to be measured;

a light source for directing a beam of light toward the tubular member mounted in said first member;

an optical detector member for detecting said beam of light on said second member; for determining the outside diameter (OD) of the tubular member at the plurality of measuring points and an ultrasonic transducer member mounted on said measuring apparatus for measuring the wall thickness and determining the inside diameter (ID) of the tubular member at each of said measuring points and a central processing unit for determining the bow of the tubular member along its length by determining the location of the center of the ID at each of said plurality of points relative to a straight line between the centers at the first of said plurality of points and at the last of said plurality of points and determining the straight through internal clearance (STIC) of the tube by creating a series of bow vectors from a least squares fit to said straight line and determining the camber of the bow from the greatest difference between the maxima and minima of the bow vectors, thereby determining the maximum diameter of a rod that can fit within the tube.

10. An apparatus as claimed in claim 9 wherein said light source comprises a laser for emitting a planar, sheet-like beam.

11. An apparatus as claimed in claim 9 wherein said optical detector member includes means for establishing a reference point for indicating deviations of the outer surface of the tubular member.

12. An apparatus as claimed in claim 9 wherein said transducer is adapted to be moved into and out of contact with said tubular member by means of a pneumatic cylinder.

13. An apparatus as claimed in claim 9 wherein the central processing unit is connected to said motor and said linear translator for controlling the action thereof.

14. An apparatus as claimed in claim 13 wherein said optical detector generates output signals which are applied to said central processing unit for processing thereby.

15. An apparatus as claimed in claim 13 wherein said ultrasonic transducer generates output signals which are applied to said central processing unit for processing thereby.

* * * * *